Feb. 16, 1965    L. H. MORIN    3,169,414
SPEED REDUCER
Filed Sept. 20, 1963
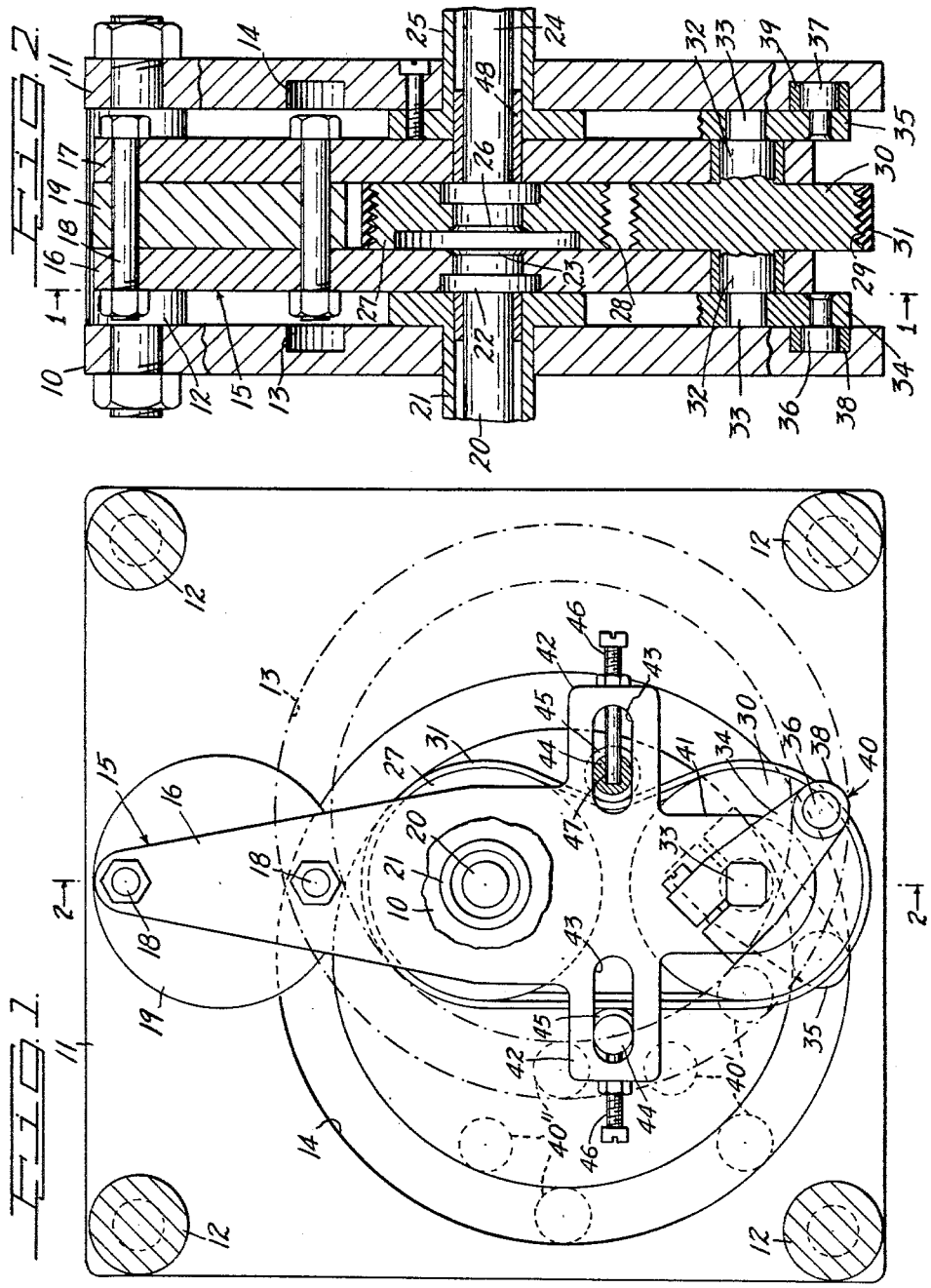
INVENTOR.
LOUIS H. MORIN
BY
Howard C. Thompson
ATTORNEY

United States Patent Office 3,169,414
Patented Feb. 16, 1965

3,169,414
SPEED REDUCER
Louis H. Morin, Bronx, N.Y.
(125 Beechwood Ave., New Rochelle, N.Y.)
Filed Sept. 20, 1963, Ser. No. 310,277
4 Claims. (Cl. 74—802)

This invention relates to speed reducers, wherein a rotatable drive unit is employed to rotate a pulley around an axis having an output or driven pulley with a belt drive between the pulleys. More particularly, the invention deals with a reducer of the character defined, wherein the axis of the pulley of the drive unit is retained against rotation by a dual lever control, having means operatively engaging pairs of cam grooves in side plates of the reducer.

Still more particularly, the invention deals with a reducer of the character defined, wherein said drive unit includes a counterweight, as well as means operatively engaging the belt employed for maintaining the belt in firm frictional engagement with the two pulleys of the reducer.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a sectional view generally along the line 1—1 of FIG. 2, with parts of the construction broken away and shown in elevation and diagrammatically illustrating in dotted lines a few of the positions of the dual lever control in operation of the reducer; and FIG. 2 is a section generally on the line 2—2 of FIG. 1, with parts of the construction shown in elevation and broken away and omitting part of the background showing.

In illustrating one adaptation and use of my invention, the reducer comprises generally similar side plates 10 and 11 secured together and spaced by bolt-like members 12 arranged at corner portions of the plates, as noted in FIG. 1 of the drawing. The plate 10 has, on its inner surface, a cam groove 13, the plate 11 having a similar groove 14, offset with respect to the groove 11, as will clearly appear from the dot-dash showing of the groove 13 in FIG. 1. At 15 I have generally shown what I term a rotatable drive unit, comprising two side arms 16 and 17, generally of the same contour, except as later noted, these arms being secured together by bolts 18 and spaced by a counterweight 19, through which the bolts 18 pass, the spacing being such as to provide clearance for the driven pulley of the reducer, later described.

The unit 15 is rotated by a drive shaft 20, having suitable bearing support in a flanged tube 21 mounted in the plate 10, as shown at the left of FIG. 2. The shaft 20 includes a collar 22 arranged in the arm 16, the shaft 20 being riveted to the arm, as diagrammatically seen at 23, so that, in the drive of the shaft 20, the entire unit rotates within and between the plates 10 and 11. At 24 is shown a driven or output shaft, having bearing support in a flanged tube 25 fixed to the plate 11, the shaft 24 being generally similar to the shaft 20 in having a rivet end portion 26 for fixedly securing a driven pulley or member 27 thereon, said pulley being freely disposed between adjacent surfaces of the arms 16 and 17, as will clearly appear from a consideration of FIG. 2 of the drawing, although no clearances are shown. The pulley 27 has circumferentially alined transversely spaced teeth 28, which are alined with corresponding teeth 29 on an input drive pulley or member 30. Operatively engaging the two pulleys is a Poly-V belt 31.

The drive pulley 30 has side shaft extensions 32 mounted in suitable bearings in the arms 16 and 17, as clearly indicated in FIG. 2 of the drawing, the shaft extensions terminating in square ends 33, note one of these square ends in FIG. 1, and mounted on the square ends 33 are a pair of similar levers 34, 35 arranged at right angles to each other and supporting at their free ends studs 36 and 37 supporting antifriction rollers 38 and 39, respectively, which operate in the grooves 13 and 14, respectively, in the side plates 10 and 11. For purposes of description, the two levers can be generally identified by a dual lever control 40 which, in combination with the squared ends 33, form a triangular contour to the control 40 and, in the rotation of the unit 15, the dual lever control maintains its fixed relationship, as the rollers 38 and 39 travel around through the grooves 13 and 14, respectively, and parts of these maintained positions of the control 40 are indicated in dotted lines at 40′ and at 40″ in FIG. 1 of the drawing. In other words, the vertical apex extending through the center of the axis of 33 is always maintained throughout the complete cycle of rotation of the unit 15.

Considering FIG. 1 of the drawing, it will be apparent that the control 40 is mounted in a reduced end portion 41 of the arms.

Also in this figure, it will be noted that the arms have, intermediate the shaft 20 and the squared ends 33 of the pulley 30, lateral extensions 42, having elongated apertures 43, in which are adjustably mounted pins 44 supporting between the extensions 42 of each of the arms rollers 45 adapted to bear upon the belt 31, as indicated at the right of FIG. 1 of the drawing, in maintaining the belt in firm frictional engagement with the pulleys 27 and 30, respectively. The pins 44 are adjusted to screws 46 mounted in the extensions 42, the screws extending into the sockets in ends of the pins 44, one of these engagements being shown at 47 at the right of FIG. 1 of the drawing.

From the foregoing, it will be apparent that the only structural difference between the two arms 16 and 17 is that the shaft 20 is riveted to the arm 16, as at 23; whereas, the arm 17 simply has an aperture to receive part of the bearing 48 supporting the shaft 24, as noted at the right of FIG. 2 of the drawing.

Considering FIG. 1 of the drawing, it will appear that the adjustment of the roller 45 at the left simply maintains the belt in a straight position between the two pulleys, but both of the rollers can be adjusted, if desired, to apply tension to the belt in establishing the desired frictional engagement with the two pulleys employed. By providing the two extensions 42, a balanced condition is provided in operation of the unit 15 and the weight 19 will be such as to counterbalance the end portion of the arms, in connection with which the drive pulley is mounted.

In use, one of the pulleys will be of a different diameter than the other pulley and the greater this difference the less reduction in drive will be provided and direction of rotation of the driven shaft 24 can be controlled by making the pulley 30 larger or smaller than the pulley 27 and, when very high reductions are required, the difference in size of the two pulleys will be very slight. As a matter of fact, if the pulleys are both of the same diameter, it will be apparent that no rotary movement would be transmitted to the driven shaft 24. No attempt has been made in the accompanying drawing to show any material variation in size between the pulleys, but it will be understood that the size of the pulleys can be varied and, when drastic changes in sizes are employed, belts of different lengths will be employed to compensate for such changes and, thus, minimize degree of adjustments of the adjustable rollers 45, as clearly noted in FIG. 1.

It will also be apparent that other means can be employed or member against rotation upon its axis, while rotating around the driven pulley or member by the rotation of the unit.

Having fully described my invention, what I claim as new and desire to secure by Letters Patent is:

1. A speed reducer comprising a support including spaced fixed plates, bolts joining and spacing said plates, a drive unit rotatable between said plates, a drive shaft mounted in one plate and fixed to said unit, a driven shaft rotatably mounted in the other plate, a driven pulley fixed to the driven shaft and arranged in said unit, said unit having a drive pulley including a shaft spaced with respect to the axis of the drive and driven shafts, said pulleys lying in a plane which is perpendicular to the drive and driven shaft axes, means mounted on the shaft of said drive pulley for retaining said drive pulley and its shaft against rotation in rotation of the drive pulley around said driven pulley in the rotation of said unit, a belt placing the drive pulley in operative engagement with said driven pulley in the reduction drive between the drive and driven shafts, said means comprising a control mounted on and movable with the shaft of said drive pulley, means engaging said control in maintaining the shaft of said drive pulley against said rotation, said control comprising a pair of levers keyed to the shaft of the drive pulley, and said levers having rollers operating in annular cam grooves on inner surfaces of said plates.

2. A speed reducer as defined in claim 1, wherein the cam groove of one plate is offset with respect to the cam groove of the other of said plates.

3. A speed reducer comprising a support including spaced fixed plates, bolts joining and spacing said plates, a drive unit rotatable between said plates, a drive shaft mounted in one plate and fixed to said unit, a driven shaft rotatably mounted in the other plate, a driven pulley fixed to the driven shaft and arranged in said unit, said unit having a drive pulley including a shaft spaced with respect to the axis of the drive and driven shafts, said pulleys lying in a plane which is perpendicular to the drive and driven shaft axes, means mounted on the shaft of said drive pulley for retaining said drive pulley and its shaft against rotation in rotation of the drive pulley around said driven pulley in the rotation of said unit, a belt placing the drive pulley in operative engagement with said driven pulley in the reduction drive between the drive and driven shafts, said means comprising a pair of levers keyed to the shaft of said drive pulley, one lever being arranged at right angles to the other lever, and said levers supporting at their ends rollers operating in cam grooves on inner surfaces of said side plates.

4. A speed reducer comprising a support including spaced fixed plates, bolts joining and spacing said plates, a drive unit rotatably mounted between said plates, a drive shaft mounted in one plate and fixed to said unit, a driven shaft rotatably mounted in the other plate, a driven member fixed to the driven shaft and arranged in said unit and around which the unit rotates, said unit supporting a drive member including a shaft spaced with respect to the axis of the drive and driven shafts, said pulleys lying in a plane which is perpendicular to the drive and driven shaft axes, means mounted on the shaft of said drive member for retaining said member and its shaft against rotation in rotation of the drive member around said driven member in rotation of said unit, said drive and driven members being of different diameters, means placing the drive member in operative engagement with said driven member in the reduction drive between the drive and driven shafts, said means comprising a control mounted on and movable with the shaft of said drive member, and means on said spaced plates engaging said control in maintaining the shaft of said drive member against said rotation.

References Cited by the Examiner
UNITED STATES PATENTS

| | | | |
|---|---|---|---|
| 2,098,573 | 11/37 | Dingle | 74—242.1 X |
| 2,459,969 | 1/49 | Schweickart | 74—802 X |
| 2,549,247 | 4/51 | Scott | 74—15.6 |

DON A. WAITE, *Primary Examiner.*